US012655287B2

(12) United States Patent
Npetgat

(10) Patent No.: US 12,655,287 B2
(45) Date of Patent: Jun. 16, 2026

(54) HIGH IMPACT STRENGTH THERMOPLASTIC COMPOSITIONS

(71) Applicant: TotalEnergies OneTech Belgium, Seneffe (BE)

(72) Inventor: Eloïne Npetgat, Seneffe (BE)

(73) Assignee: TotalEnergies OneTech Belgium, Seneffe (BE)

( * ) Notice: Subject to any disclaimer, the term of this patent is extended or adjusted under 35 U.S.C. 154(b) by 506 days.

(21) Appl. No.: 18/263,670

(22) PCT Filed: Jan. 25, 2022

(86) PCT No.: PCT/EP2022/051659
§ 371 (c)(1),
(2) Date: Jul. 31, 2023

(87) PCT Pub. No.: WO2022/161962
PCT Pub. Date: Aug. 4, 2022

(65) Prior Publication Data

US 2024/0132712 A1 Apr. 25, 2024

(30) Foreign Application Priority Data

Jan. 29, 2021 (EP) .................................... 21154238

(51) Int. Cl.
*C08L 53/02* (2006.01)
*B29C 48/00* (2019.01)
(Continued)

(52) U.S. Cl.
CPC .......... *C08L 53/025* (2013.01); *B29C 48/022* (2019.02); *C08F 2/001* (2013.01);
(Continued)

(58) Field of Classification Search
None
See application file for complete search history.

(56) References Cited

U.S. PATENT DOCUMENTS

| | | | |
|---|---|---|---|
| 3,994,856 | A | 11/1976 | Katchman et al. |
| 4,128,604 | A | 12/1978 | Katchman et al. |

(Continued)

FOREIGN PATENT DOCUMENTS

| | | | |
|---|---|---|---|
| EP | 0086448 | A1 | 8/1983 |
| JP | 59232140 | A | 12/1984 |
| JP | 61215640 | A | 9/1986 |
| JP | 63072711 | A | 4/1988 |
| JP | 04100810 | A | 4/1992 |

OTHER PUBLICATIONS

International Search Report and Written Opinion of the International Searching Authority from the European Patent Office, in PCT/EP2022/051659 dated Apr. 11, 2022, which is an international application to which this application claims priority.

*Primary Examiner* — Christopher M Rodd
(74) *Attorney, Agent, or Firm* — Kolitch Romano Dascenzo Gates LLP

(57) ABSTRACT

The present invention is related to high Impact strength thermoplastic compositions comprising: a) from 10 to 90% by weight of a rubber-modified monovinylidene aromatic (co)polymer; b) from 10 to 90% by weight of a polyphenylene ether; wherein: said rubber-modified monovinylidene aromatic (co)polymer a) comprising: I) a matrix comprising monovinylidene aromatic polymer, and II) from 5 to 25% by weight of rubber in the form of discrete rubber particles dispersed within the matrix, wherein the rubber particles comprise a blend of at least two polybutadienes as well as graft- and block copolymers of polybutadiene and monovinylidene aromatic polymer segments, said rubber particles exhibit: —an average particle size by volume (D50) comprised between 0.8 and 5.5 μm, measured by laser light scattering; said blend of at least two polybutadienes comprises: —at least 50% by weight of one or more polybutadiene(s) with a cis-1,4 structure content of at least 80% by weight and—at most 50% by weight of one or more polybutadiene(s) with a trans-1-4 structure content of at least 25% by weight and a 1,2-vinyl content of at least 5% by weight; said blend being characterized by a dynamic solution viscosity, comprised between 50 and 160 mPa·s, as determined by Brookfield viscometer according to ISO 2555 at a concentration of 5.43% by weight in toluene; and said polyphenylene ether b) has a repeating structural formula (I) wherein R1 and R2 are independently selected from the group consisting of a hydrogen atom, a halogen atom, C1-4 alkyl radicals, C1-4 alkoxy radicals, C6-10 aromatic radicals which are unsubstituted or substituted by a C1-4 alkyl radical, halohydrocarbon radicals having at least two carbon atoms between the halogen atom and the phenyl nucleus, hydrocarbonoxy radicals and halohydrocarbonoxy radicals having at least two carbon atoms between the halogen and the phenyl nucleus, and wherein n is an integer of at least 50. The invention further is related to a method for the preparation of the high Impact strength thermoplastic compositions.

(I)

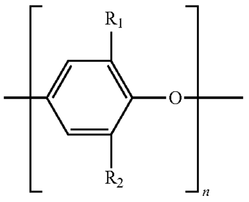

13 Claims, No Drawings

(51) Int. Cl.

| | |
|---|---|
| ***B29K 9/06*** | (2006.01) |
| ***B29K 71/00*** | (2006.01) |
| ***C08F 2/00*** | (2006.01) |
| ***C08F 12/08*** | (2006.01) |
| ***C08L 51/00*** | (2006.01) |
| ***C08L 71/12*** | (2006.01) |

(52) U.S. Cl.
CPC ............ *C08F 12/08* (2013.01); *C08L 51/003* (2013.01); *C08L 71/123* (2013.01); *B29C 2948/92704* (2019.02); *B29K 2009/06* (2013.01); *B29K 2071/12* (2013.01); *C08L 2205/025* (2013.01); *C08L 2205/035* (2013.01); *C08L 2205/22* (2013.01)

(56) References Cited

U.S. PATENT DOCUMENTS

| | | | |
|---|---|---|---|
| 4,368,293 | A | 1/1983 | Yamashita et al. |
| 4,410,654 | A | 10/1983 | Brandstetter et al. |
| 4,436,854 | A | 3/1984 | Brandstetter et al. |
| 4,543,391 | A | 9/1985 | Kuribayashi et al. |
| 4,824,887 | A | 4/1989 | Aycock et al. |
| 4,900,786 | A | 2/1990 | Abolins et al. |
| 2020/0123378 | A1* | 4/2020 | Youm .................. C08L 71/123 |

* cited by examiner

HIGH IMPACT STRENGTH THERMOPLASTIC COMPOSITIONS

FIELD OF THE INVENTION

The present invention relates to a high Impact strength thermoplastic composition comprising a blend of rubber-modified vinyl aromatic polymers and polyphenylene ethers, said composition having improved mechanical properties. The present invention further relates to a process for the preparation of said composition.

STATE OF THE ART

Thermoplastic compositions comprising polyphenylene ether resins and rubber-modified monovinylidene aromatic polymers are well known in the art and have achieved great commercial significance as engineering thermoplastics from which many important shaped articles are made, including business machine housings, automotive parts and foamed packaging materials.

The utility of a particular high impact high impact strength thermoplastic composition depends on the type of the constituent polymers and their relative ratio, resulting in a combination of mechanical, thermal and/or physical properties that render the material suitable for a particular application; yet for a majority of applications, mechanical properties are the key feature.

Various compositions based on rubber-modified monovinylidene aromatic polymers and polyphenylene ethers have been disclosed.

U.S. Pat. No. 4,128,604 discloses a high impact strength thermoplastic composition comprising a) a polyphenylene ether and
b) a rubber-modified polystyrene resin, said composition having a dispersed particulate rubber phase in which the particles have a maximum mean diameter of about 2 μm, said composition containing at least 22% by weight of a particulate rubber gel phase, on a polyphenylene ether-free basis, dispersed in a polystyrene matrix, and said rubber comprising a polybutadiene having a cis-1,4 content of at least 50% by weight and a vinyl group content of no more than 10% by weight of said polybutadiene.

The mean diameter of the dispersed elastomeric particles is from 0.5 to 2 μm

U.S. Pat. No. 4,900,786 discloses a thermoplastic composition suitable for blow moulding large parts, said composition comprising:

a) from about 5 to about 95 parts by weight of a polyphenylene ether resin; and
b) from about 95 to about 5 parts by weight of a rubber-modified high impact polystyrene resin having a particulate rubber content of greater than about 12 percent by weight, based on the weight of component b), the rubber particles having an average diameter of greater than about 3 μm.

U.S. Pat. No. 3,994,856 discloses a normally solid thermoplastic composition comprising:

a) from 5 to 45% by weight of the resinous components of the composition of a polyphenylene ether resin,
b) from 40 to 85% by weight of the resinous components of the composition of a high impact rubber-modified polystyrene resin or a blend of a high impact rubber-modified polystyrene resin and a homopolystyrene resin; and
c) from 5 to 25% by weight of the resinous components of the composition of an elastomeric block copolymer.

U.S. Pat. No. 4,824,887 discloses thermoplastic compositions of improved mould flow comprising a polyphenylene ether resin and novel rubber-modified polystyrenes containing dispersed rubbery particles having a maximum mean diameter of about 2.0 μm and a ratio of the volume average particle size/number average particle size of from 2.00 to 3.20.

U.S. Pat. No. 4,410,654 discloses thermoplastic moulding material comprising an impact resistant styrene polymer and polyphenylene ether wherein the moulding material contains 0.1 to 5 percent by weight, based on the mixture of styrene polymer and polyphenylene ether, of a hydrocarbon wax having a melt viscosity of less than 500 centistokes measured at 120° C.

U.S. Pat. No. 4,543,391 discloses a resin composition which consists essentially of 20 to 80% by weight of polyphenylene ether, and 80 to 20% by weight of rubber reinforced high impact polystyrene, wherein the polyphenylene ether employed has the intrinsic viscosity r (30° C., chloroform solution) in the range of 0.50 to 0.80.

U.S. Pat. No. 4,368,293 discloses a polyphenylene ether composition which comprises:

a) 80-20 parts by weight of polyphenylene ether resin, and
b) 20-80 parts by weight of a rubber-reinforced polystyrene wherein 5-25% by weight of polybutadiene having 18-35% of 1,2-vinyl-structure is dispersed forming discontinuous elastomer phase.

U.S. Pat. No. 4,436,854 discloses a self-extinguishing thermoplastic material comprising:

a) from 70 to 10 parts by weight of an impact-resistant styrene polymer containing a soft component based on a grafted polybutadiene or a grafted copolymer of butadiene and styrene,
b) from 30 to 90 parts by weight of a polyphenylene ether and
c) from 1 to 20 parts by weight of a phosphorus-containing compound as flameproofing additive, wherein the soft component of the impact-resistant styrene polymer a) consists essentially of a mixture of from 98 to 10 percent by weight of particles having a mean particle size of from 0.3 to 1.2 μm and from 2 to 90 percent by weight of particles having a mean particle size of from 4 to 10 μm and wherein said mixture is obtained by blending impact-resistant styrene polymers whose soft components have different particle sizes.

EP 0086448 discloses a thermoplastic composition, comprising an admixture of a) a blend of a polyphenylene ether resin and a rubber-modified high impact polystyrene; and
b) an impact strength improving amount of a block terpolymer of styrene, butadiene and caprolactone;

wherein the polyphenylene ether and polystyrene are present in a weight ratio of from 4:1 to 1:4 polyphenylene ether:polystyrene.

US 2020/0123378 discloses a thermoplastic resin composition comprising:

100 parts by weight of a base resin comprising about 20 wt % to about 80 wt % of a polyphenylene ether resin and about 20 wt % to about 80 wt % of a rubber-reinforced polystyrene resin;
about 1 part by weight to about 20 parts by weight of a styrene-based block copolymer resin; and
about 0.5 parts by weight to about 15 parts by weight of a hydrocarbon-based oil.

wherein the rubber-reinforced polystyrene resin comprises a first rubber-reinforced polystyrene resin and a second rubber-reinforced polystyrene resin in a weight ratio of about 0.3:1 to about 5:1, the first rubber-reinforced polystyrene resin comprising a rubber polymer having an average particle diameter of about 0.1 μm to less than about 0.8 μm, the second rubber-reinforced polystyrene resin comprising a rubber polymer having an average particle diameter of about 0.8 μm to about 4 μm.

The rubber-reinforced polystyrene resin of the thermoplastic resin composition also comprises styrene-based graft- and/or block copolymers.

Without contesting the associated advantages of the state of the art systems, it is nevertheless obvious that there is still a need for high impact strength thermoplastic compositions exhibiting improved mechanical properties.

AIMS OF THE INVENTION

The present invention aims to provide improved high impact strength thermoplastic composition showing a unique combination of mechanical properties.

The present invention aims to provide high impact strength thermoplastic composition with improved Notched Izod impact strength at room temperature, said impact strength decreasing within acceptable values within a temperature range of from 23 to −20° C.

SUMMARY OF THE INVENTION

The present invention discloses a high Impact strength thermoplastic composition comprising:

a) from 10 to 90% by weight of a rubber-modified monovinylidene aromatic (co)polymer;

b) from 10 to 90% by weight of a polyphenylene ether;

wherein:

said rubber-modified monovinylidene aromatic (co)polymer a) comprises:

I) a matrix comprising monovinylidene aromatic polymer, and

II) from 5 to 25% by weight of rubber in the form of discrete rubber particles dispersed within the matrix, wherein the rubber particles comprise a blend of at least two polybutadienes as well as graft- and block copolymers of polybutadiene and monovinylidene aromatic polymer segments, said rubber particles exhibit:

an average particle size by volume (D50) comprised between 0.8 and 5.5 μm, measured by laser light scattering;

said blend of at least two polybutadienes comprises:

at least 50% by weight of one or more polybutadiene(s) with a cis-1,4 structure content of at least 80% by weight and at most 50% by weight of one or more polybutadiene(s) with a trans-1-4 structure content of at least 25% by weight and a 1,2-vinyl content of at least 5% by weight;

said blend of at least two polybutadienes, as such and prior to being part of the rubber-modified monovinylidene aromatic (co)polymer a), being characterized by a dynamic solution viscosity, comprised between 50 and 160 mPa·s, as determined by Brookfield viscometer according to ISO 2555 at a concentration of 5.43% by weight in toluene; and said polyphenylene ether b) has a repeating structural formula:

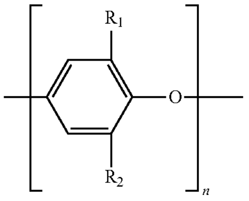

wherein R1 and R2 are independently selected from the group consisting of a hydrogen atom, a halogen atom, C1-4 alkyl radicals, C1-4 alkoxy radicals, C6-10 aromatic radicals which are unsubstituted or substituted by a C1-4 alkyl radical, halohydrocarbon radicals having at least two carbon atoms between the halogen atom and the phenyl nucleus, hydrocarbonoxy radicals and halohydrocarbonoxy radicals having at least two carbon atoms between the halogen and the phenyl nucleus, and wherein n is an integer of at least 50.

Preferred embodiments of the present invention disclose on or more of the following features:

the rubber particles of the rubber-modified monovinylidene aromatic polymer a) are characterized by a D90 of 12 μm or less and a span (D90−D10)/D50 equal to or less than 2;

the monovinylidene aromatic polymer of the rubber-modified monovinylidene aromatic polymer a) is the polymerization product of one or more monovinylidene vinyl aromatic compounds selected from the group consisting of styrene, alpha-methyl styrene and ring-substituted styrenes;

the monovinylidene aromatic polymer of the rubber-modified monovinylidene aromatic polymer a) is characterized by a weight average molecular weight comprised between 130,000 and 300,000 g/mol;

the monovinylidene aromatic polymer of the rubber-modified monovinylidene aromatic polymer a) is polystyrene;

the rubber-modified monovinylidene aromatic polymer composition comprises from 8 to 12% by weight of rubber in the form of discrete, dispersed rubber particles dispersed within the polymer matrix;

the polyphenylene ether b) has a repeating structural formula:

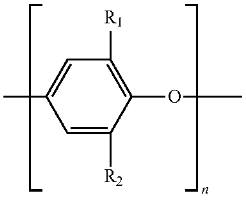

o wherein R1 and R2 are independently selected from the group consisting of a hydrogen atom, a chlorine atom, a methyl radical, a phenyl radical, a t-butyl radical, a methoxy radical, an m-tolyl radical, and a p-tolyl radical.

The present invention further discloses a method for the preparation of the high Impact strength thermoplastic composition comprising feeding rubber-modified monovinylidene aromatic polymer a), by means of a first feeder, and the polyphenylene ether b), by means of a second feeder, into an extruder, wherein the feed flow rate settings of the first and the second feeder are controlled in such a way that a feed ratio of rubber-modified monovinylidene aromatic polymer a) to polyphenylene ether b), corresponds to the ratio of a) to b) in the final high Impact strength thermoplastic composition, and extruding the mixture of a) and b) at a temperature of at least 250° C., preferably at a temperature up to at least 280° C.

Preferred embodiments of the method for the preparation of the high impact strength thermoplastic composition disclose one or more of the following features:

- the rubber-modified monovinylidene aromatic polymer a) is prepared in a process, comprising the steps of:
  - a1) providing a solution of a blend of at least two polybutadienes in vinyldiene aromatic monomer;
  - a2) polymerizing the solution of monovinylidene aromatic monomer and polybutadiene of a1) in a continuous multi reactor process comprising at least two series-connected stirred vessels with continuous flow, starting at a temperature comprised between 90 and 130° C. and stepwise increasing to a temperature comprised between 90 and 190° C. to a monomer conversion of from 70 to 90%;
  - a3) devolatilizing the composition of step a2) at a temperature comprised between 210 and 255° C. and a pressure comprised between 1 and 100 mbar·abs; wherein
- from 5 to 15% by weight, preferably from 8 to 12% by weight of a blend of at least two polybutadienes is provided in step a1);
- the blend of at least two polybutadienes, provided in step a1), comprises at least 50% by weight of one or more polybutadiene(s) with a cis-1,4 content of at least 80% by weight and at most 50% by weight of one or more polybutadiene(s) with a trans-1,4 structure content of at least 25% by weight and a 1,2-vinyl content of at least 5% by weight;
- one or more polymerization initiator(s) is (are) optionally provided in step a2), said one or more polymerization initiator(s) being free radical initiator(s);
- one or more retarding agent(s), selected from the group consisting of free radical scavenger, a polyfunctional (meth)acrylic monomer, an allylic compound, a metal salt of an unsaturated monocarboxylic acid, a tertiary amine oxide, an aromatic tertiary amine oxide, a tertiary amine and mixtures thereof, is (are) optionally added before initiation of step a3).

The present invention additionally discloses a high Impact strength thermoplastic composition, characterized by:

- an Izod impact strength, according to ISO 180/1eA, of at least 8.5 kJ/m$^2$, measured at 23° C.;
- an Izod impact strength, according to ISO 180/1eA, of at least 7 kJ/m$^2$, measured at −20° C.;
- a young modulus, according to ISO 527-2, of at least 1900 MPa; and
- a tensile strength at break, according to ISO 527-2, of at least 40 MPa.

DETAILED DESCRIPTION OF THE INVENTION

Definitions

For the purpose of the invention the following definitions are given.

As used herein, a “polymer” is a polymeric compound prepared by polymerizing monomers, whether of the same or a different type. The generic term polymer thus embraces the term homopolymer, usually employed to refer to polymers prepared from only one type of monomer, and the terms copolymer and interpolymer as defined below.

As used herein, a “copolymer”, “interpolymer” and like terms mean a polymer prepared by the polymerization of at least two different types of monomers. These generic terms include polymers prepared from two or more different types of monomers, i.e. terpolymers, tetrapolymers, etc.

As used herein, “blend”, “polymer blend” and like terms refer to a composition of two or more compounds, typically two or more polymers. As used herein, “blend” and “polymer blend” also include “reactor blends,” such as where a monomer is polymerized in the presence of a polymer. For example, the blend may initially be a blend of a first polymer and one or more monomers which are then polymerized to form a second polymer. A blend may or may not be miscible. A blend may or may not be phase separated. A blend may or may not contain one or more domain configurations, as determined from transmission electron spectroscopy, light scattering, x-ray scattering, or any other method known in the art. Preferred blends (i.e. preferred reactor blends) include two or more phases. For example, the blend may include a first phase including some or all of the monovinylidene aromatic polymer and a second phase including some or all of the rubber.

As used herein, “composition” and like terms mean a mixture or blend of two or more components. The composition of this invention is the rubber-modified monovinylidene aromatic polymer. The composition may include other components, polymeric or non-polymeric (i.e., additives), necessary or desirable to the end use of the composition.

The terms “comprising”, “comprises” and “comprised of” as used herein are synonymous with “including”, “includes” or “containing”, “contains”, and are inclusive or open-ended and do not exclude additional, non-recited members, elements or method steps.

The recitation of numerical ranges by endpoints includes all integer numbers and, where appropriate, fractions subsumed within that range (e.g. 1 to 5 can include 1, 2, 3, 4 when referring to, for example, a number of elements, and can also include 1.5, 2, 2.75 and 3.80, when referring to, for example, measurements). The recitation of end points also includes the recited end point values themselves (e.g. from 1.0 to 5.0 includes both 1.0 and 5.0). Any numerical range recited herein is intended to include all sub-ranges subsumed therein.

The particular features, structures, characteristics or embodiments may be combined in any suitable manner, as would be apparent to a person skilled in the art from this disclosure, in one or more embodiments.

The Composition

The present invention relates to high impact strength thermoplastic compositions comprising a blend of polyphenylene ethers and rubber-modified monovinylidene aromatic (co)polymers, said rubber-modified monovinylidene aromatic (co)polymers comprising uniformly dispersed rubber particles, obtained from a blend of at least two polybutadienes, having different 1,4-cis structure contents, said rubber particles exhibiting a volume median particle diameter (D50) comprised between 0.8 and 5.5 μm.

A preferred range of polyphenylene ethers for being used in the composition of the present invention has repeating structural units of the formula:

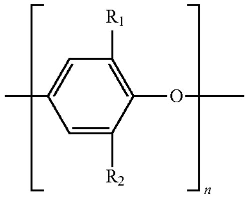

wherein the oxygen ether atom of one unit is connected to the benzene nucleus of the next adjoining unit, n is a positive integer and is at least 50 and each of R1 and R2 are monovalent substituents independently selected from the group consisting of hydrogen, halogen, hydrocarbon radicals, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene)ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-stearyloxy-1,4-phenylene)ether; poly(2,6-dichloro-1,4-phenylene)ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,5-dibromo-1,4-phenylene)ether; and the like.

For purposes of the present invention an especially preferred range of polyphenylene ethers includes those having alkyl substitution in the two positions ortho to the oxygen ether atom, i.e., those of the above formula wherein each of R1 and R2 is alkyl, most preferably having from 1 to 4 carbon atoms. Illustrative members of this class are poly(2,6-dimethyl-1,4-phenylene)ether; poly(2,6-diethyl-1,4-phenylene) ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with monovinylidene aromatic polymers over the entire range of combining ratios.

The polyphenylene ethers are self-condensation products of monohydric monocyclic phenols produced by reacting the phenols with oxygen in the presence of catalysts, such as a cupper complex catalyst. In general, molecular weight will be controlled by reaction time, longer times providing a higher average number of repeating units.

The rubber-modified monovinylidene aromatic polymers comprise rubber particles comprising a blend of at least two polybutadienes as well as graft- and block copolymers of polybutadiene and monovinylidene aromatic polymer segments, homogeneously dispersed in a monovinyl aromatic polymer matrix, said rubber particles exhibiting a particle size distribution by volume within the range of from 0.1 and 15 μm.

Monovinylidene aromatic polymers suitable for use as the matrix in the composition of the present invention are those produced by polymerizing a monovinyl aromatic monomer. Monovinyl aromatic monomers include, monomers of the formula:

$$Ar—CR{=}CH_2$$

wherein R is hydrogen or methyl, Ar is an aromatic ring structure having from 1 to 3 aromatic rings with or without alkyl, halo, or haloalkyl substitution, wherein any alkyl group contains 1 to 6 carbon atoms and haloalkyl refers to a halo substituted alkyl group.

Preferably, Ar is phenyl or alkylphenyl, wherein alkylphenyl refers to an alkyl substituted phenyl group, with phenyl being most preferred.

Typical vinyl aromatic monomers which can be used include styrene, alpha-methylstyrene, all isomers of vinyl toluene, especially paravinyltoluene, all isomers of ethyl styrene, propyl styrene, methyl-4-styrene, methyl-3-styrene, methoxy-4-styrene, hydroxymethyl-2-styrene, ethyl-4-styrene, ethoxy-4-styrene, dimethyl-3,4-styrene, chloro-2-styrene, chloro-3-styrene, chloro-4-methyl-3-styrene, tert-butyl-3-styrene, dichloro-2,4-styrene, dichloro-2,6-styrene, vinyl biphenyl, vinyl naphthalene, vinyl anthracene and the like, and mixtures thereof. It would not depart from the scope of the invention to use more than one monovinylaromatic monomer. Preferably, the monovinylaromatic monomer includes or consists of styrene.

The monovinylidene aromatic polymer is the monovinylidene aromatic polymer matrix in the rubber-modified monovinylidene aromatic polymer. The concentration of the monovinylidene aromatic monomers (i.e. the concentration of styrene) preferably is 60% by weight or more, more preferably 65% by weight or more, even more preferably 70% by weight or more, even more preferably 80% by weight or more, even more preferably 88% by weight or more, based on the total weight of the rubber-modified monovinylidene aromatic polymer.

The monovinylidene aromatic monomers may also be combined with other copolymerizable monomers. Examples of such monomers include, but are not limited to, acrylic monomers such as acrylonitrile, methacrylonitrile, (meth) acrylic acid, C1-C18 alkyl(meth)acrylate; fumaronitrile; methyl methacrylate or n-butyl acrylate; maleimide, phenylmaleimide, maleic anhydride and/or n-aryl maleimides such as n-phenyl maleimide, and conjugated and nonconjugated dienes and alkyl esters of acrylic or methacrylic acid. Representative copolymers include styrene-acrylonitrile (SAN) copolymers. The polymerization of the vinyl aromatic monomer is conducted in the presence of pre-dissolved elastomer to prepare impact modified, or grafted rubber containing products.

In a preferred embodiment, the rubber-modified monovinylidene aromatic polymer is a rubber-modified polystyrene (HIPS) or a rubber-modified poly(styrene-acrylonitrile) (ABS). More preferably, the rubber-modified monovinylidene aromatic polymer is a rubber-modified polystyrene (HIPS).

The molecular weight of the monovinylidene aromatic polymer may be characterized by the weight average molecular weight (Mw), and a dispersity ($D_M$=Mw/Mn).

The molecular weight of the monovinylidene aromatic polymer influences its mechanical strength and its rheological properties. In the invention, the molecular weight should be sufficiently high so that the composition has good impact strength, despite having a low concentration of the rubber (i.e. at most 25% by weight based on the total weight of the rubber-modified monovinylidene aromatic polymer) and/or a generally high concentration of monovinylidene aromatic polymer (i.e. at least 75% by weight based on the total weight of the rubber-modified monovinylidene aromatic polymer).

The monovinylidene aromatic polymer of the present invention is characterized by a weight average molecular weight (Mw) comprised between 130,000 and 300.00 g/mol, preferably between 150,000 and 250,000 g/mol, more preferably between 170,000 and 230,000 g/mol and a dispersity ($D_M$=Mw/Mn) comprised between 2.0 and 3.0, preferably between 2.2 and 2.8.

The rubber present in the composition of the present invention is in the form of discrete, dispersed rubber particles comprising a blend of:

- a) one or more polybutadienes (A) having
  - a cis 1,4 structure content of at least 80 weight percent, preferably of at least 85% by weight, more preferably of at least 90% by weight, most preferably of at least 95% by weight; and
  - a 1,2-vinyl contents of at most 5% by weight, preferably of at most 4% by weight, more preferably of at most 3% by weight, most preferably of at most 2.5% by weight;
- b) one or more polybutadienes (B), having
  - a trans 1,4 structure content of at least 25% by weight, preferably of at least 35% by weight, more preferably of at least 45% by weight, most preferably of at least 50% by weight; and
  - a 1,2-vinyl contents of at least 5% by weight, preferably of at least 7% by weight, more preferably of at least 9% by weight, most preferably of at least 10% by weight.

The rubber particle comprising a blend present in the composition of the present invention comprises:

- at least 50% by weight of one or more polybutadienes (A), preferably at least 60% by weight, more preferably at least 70% by weight, most preferably at least 80% by weight of one or more polybutadienes (A), and
- at most 50% by weight, preferably at most 40% by weight, more preferably at most 30% by weight, most preferably at most 20% by weight of one or more polybutadienes (B).

The polybutadiene blend comprising one or more polybutadiene(s) (A) and one or more polybutadiene(s) (B), used as starting material for the preparation of the rubber-modified monovinylidene aromatic (co)polymer and prior to being incorporated in the rubber-modified monovinylidene aromatic (co)polymer, is characterized by a dynamic solution viscosity, as determined by Brookfield viscometer according to ISO 2555 at a concentration of 5.43% by weight in toluene and at 20° C., of from 50 to 160 mPa·s, preferably of from 60 to 150 mPa·s, more preferably of from 70 to 140 mPa·s.

The polybutadiene blend comprising one or more polybutadiene(s) (A) and one or more polybutadiene(s) (B) is present in the monovinylidene aromatic polymer matrix at a concentration of from 5 to 25% by weight, preferably of from 5 to 20% by weight, more preferably of from 5 to 15% by weight, most preferably of from 8 to 12% by weight based on the total weight of the composition comprising the monovinylidene aromatic polymer matrix and the polybutadiene blend.

The polybutadiene blend, present in the monovinylidene aromatic polymer matrix is present in the form of discrete, dispersed rubber particles characterized by a particle size distribution by volume within the range of from 0.1 and 15 μm, preferably of from 0.3 and 12 μm, more preferably of from 0.4 and 10 μm, most preferably of from 0.5 to 8 μm.

The dispersed rubber particles are characterized by:

- a volume median particle diameter (D50(v)) comprised between 0.8 and 5.5 μm, preferably between 1 and 5 μm, more preferably between 1.5 and 4.5 μm;
- a D90 of 12 μm or less, preferably a D90 of 10 μm or less, more preferably a D90 of 8 μm or less; and
- a span (D90–D10)/D50 equal to or less than 2, preferably equal to or less than 1.8, more preferably equal to or less than 1.6, most preferably equal to or less than 1.5;

wherein:

D90 represents the particle diameter where 90% by volume of the rubber particles lies below and D10 represents the particle diameter where 10% by volume of the rubber particles lies below.

Preferably the particle size distribution is monomodal.

Particle size distribution is determined by the laser light scattering granulometry technique using the particle size analyzer (HORIBA 920) from (Horiba Scientific). This technique is used to characterize rubber particle size distribution in high impact polystyrene (HIPS) since more than 30 years (R. A. Hall, R. D. Hites, and P. Plantz, "*Characterization of rubber particle size distribution of high-impact polystyrene using low-angle laser light scattering*", *J. Appl. Polym. Sci.* 27, 2885, (1982)).

The technique of laser diffraction is based on the principle that particles passing through a laser beam will scatter light at an angle that is directly related to their size: large particles scatter at low angles, whereas small particles scatter at high angles. The laser diffraction is accurately described by the Fraunhofer approximation and the Mie theory, with the assumption of spherical particle morphology.

Concentrated suspensions, comprising about 1.0% by weight of rubber-modified monovinylidene aromatic polymer are prepared, using suitable wetting and/or dispersing agents.

Suitable solvents are for example water or organic solvents such as for example ethanol, isopropanol, octane or methyl ethyl ketone. A sample presentation system ensures that the material under test passes through the laser beam as a homogeneous stream of particles in a known, reproducible state of dispersion.

Particle size measurements are performed on pure solvent, e.g. 150 ml of methyl ethyl ketone, to which the concentrated suspension of polybutadiene particles is added drop by drop until the concentration of rubber particles is such that a transmission, as displayed by the particle size analyzer (HORIBA 920), comprised between 75 and 90% is obtained.

The high impact strength thermoplastic composition of the present invention comprises at least 10% by weight, preferably at least 15% by weight, more preferably at least 20% by weight, most preferably at least 25% by weight of polyphenylene ether.

The high impact strength thermoplastic composition of the present invention comprises at most 90% by weight, preferably at most 85% by weight, more preferably at most 80% by weight, most preferably at most 75% by weight of polyphenylene ether.

The high impact strength thermoplastic composition of the present invention comprises at least 10% by weight, preferably at least 15% by weight, more preferably at least 20% by weight, most preferably at least 25% by weight of rubber-modified monovinylidene aromatic polymer.

The high impact strength thermoplastic composition of the present invention comprises at most 90% by weight, preferably at most 85% by weight, more preferably at most 80% by weight, most preferably at most 75% by weight of rubber-modified monovinylidene aromatic polymer.

The compositions of the invention can further comprise one or more fillers and/or additives as long as they do not detrimentally affect the desired property combinations that are otherwise obtained or, preferably, they would improve one or more of the properties.

For example, in an embodiment, the high impact strength thermoplastic compositions of the present invention further may comprise one or more flame retarding agents such as decabromodiphenyl oxide, decabromodiphenyl ethane, 1,2-bis(tri-bromophenoxy) ethane, ethylene-1,2-bis(pentabromophenyl), tris(tribromo phenoxy)triazine, deca bromodiphenyl amine, decabromodiphenyl oxide, pentabromobenzyl acrylate, tetra bromobisphenol A, N,N'-bis(tetrabromophthalimide), N,N'-ethylenebis(tetra bromo phthalimide), pentabromo benzyl acrylate, brominated polystyrene, and brominated epoxy oligomers and polymers; one or more inorganic flame retardant synergists such as iron oxide, tin oxide, zinc oxide, aluminum trioxide, alumina, antimony tri- and pentoxide, and boron compounds, antimony silicates and ferrocene; one or more anti-dripping agent such as polytetrafluoroethylene; and conventional ingredients, such as fillers, pigments, colorants, UV stabilizers, heat stabilizers, lubricants, antioxidants (i.e., hindered phenols such as, for example, IRGANOX™1076) plasticizers, mould release agents, processing aids other than mineral oil (such as other oils, organic acids such as stearic acid, metal salts of organic acids).

The concentration of each of the conventional additives is typically in the range up to 25% by weight, and more preferably up to 15% by weight, of the total weight of the high impact strength thermoplastic composition.

The inventors have surprisingly found that incorporation of one or more flame retardants, one or more flame retardant synergists, one or more antioxidants and one or more lubricants has a negligible or no influence on the mechanical properties of the high impact strength thermoplastic composition of the present invention and thus does not modify/deteriorate its mechanical properties.

The high impact strength thermoplastic compositions of this invention can comprise polymers other than the monovinylidene aromatic polymers, the rubber and the polyphenylene ether.

Representative other polymers include, but are not limited to ethylene polymer (i.e. low density polyethylene (LDPE), ultra-low density polyethylene (ULDPE), medium density polyethylene (MDPE), linear low density polyethylene (LLDPE), high density polyethylene (HDPE), homogeneously branched linear ethylene polymer, substantially linear ethylene polymer, graft-modified ethylene polymers, ethylene vinyl acetate interpolymer, ethylene acrylic acid interpolymer, ethylene ethyl acetate interpolymer, ethylene methacrylic acid interpolymer, ethylene methacrylic acid ionomer, and the like), conventional polypropylene (i.e. homopolymer polypropylene, polypropylene copolymer, random block polypropylene interpolymer and the like), polyether block copolymer (i.e. PEBAX), (co)polyester polymer, polyester/polyether block polymer (i.e. HYTEL), ethylene carbon monoxide interpolymer (i.e., ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/carbon monoxide (SCO), polyethylene terephthalate (PET), chlorinated polyethylene, styrene-butadiene-styrene (SBS) interpolymer, styrene-ethylene-butadiene-styrene (SEBS) interpolymer, and the like and mixtures of two or more of these other polymers. The polyolefins that can comprise one or more of the other polymers include both high and low molecular weight polyolefins, and saturated and unsaturated polyolefins.

If the composition comprises one or more other polymers, then the other polymers typically are present in an amount of no more than 20% by weight of the total weight of the composition, preferably no more than 15% by weight, ore preferably no more than 10% by weight, more preferably no more than 5% by weight, and most preferably no more than 2% by weight of the total weight of the composition.

Process to Prepare the Composition

Another subject of the invention relates to a process for the manufacture of the high impact strength thermoplastic composition of the present invention as described above.

The high impact strength thermoplastic composition preferably is prepared in a process comprising feeding rubber-modified monovinylidene aromatic polymer, by means of a first feeder, and the polyphenylene ether, by means of a second feeder, into an extruder, preferably a twin-screw extruder.

The feed flow rate settings of the first and the second feeder are regulated and controlled in such a way that the ratio of rubber-modified monovinylidene aromatic polymer and polyphenylene ether, in the mixture entering the extruder, corresponds to the ratio of rubber-modified monovinylidene aromatic polymer and polyphenylene ether in the final high Impact strength thermoplastic composition.

The mixture of rubber-modified monovinylidene aromatic polymer and polyphenylene ether then is extruded at a temperature of at least 250° C., preferably at a temperature up to at least 280° C.

The rubber-modified monovinylidene aromatic polymer may be prepared in a suspension or bulk polymerization process; the principle of these two techniques being well known to a person skilled in the art.

Preferably the polymerization stage is a bulk polymerization process.

In the bulk polymerization process, the polybutadienes are first ground and dissolved in the at least one monovinylidene aromatic monomer, optionally in the presence of an organic solvent. The polymerization will be generally conducted between 80° C. and 210° C. and preferably between 90° C. and 190° C., optionally in the presence of one or more polymerization initiator(s) and optionally one or more transfer agent(s). During this polymerization stage the monovinylidene aromatic monomer is polymerized either by itself or with a proportion of the polybutadienes and in this latter case grafting is said to take place between the polybutadienes and the vinylidene aromatic monomer and, in addition, the polybutadienes are partially crosslinked.

Suitable polymerization initiators are chemical initiators including peroxide initiators such as peresters, e.g. tertiary butyl peroxybenzoate and tertiary butyl peroxyacetate, tertiary butyl peroxyoctoate, dibenzoyl peroxide, dilauroyl peroxide, 1.1-bis tertiarybutyl peroxycyclohexane, 1-3-bis tertiarybutylperoxy-3,3,5-trimethyl cyclohexane, ethyl 3,3 di-t-buty peroxy butyrate, dicumyl peroxide, and the like. Photochemical initiation techniques can be employed if desired. Preferred initiators include tertiary butyl peroctoate, tertiary butyl isopropyl percarbonate, dibenzoyl peroxide, tertiary butyl peroxybenzoate, 1,1-bistertiarybutylperoxycyclo hexane and tertiarybutylperoxy acetate.

Preferably chemical initiators are used in an amount of from 50 to 1000 ppm, more preferably of from 75 to 800 ppm, most preferably of from 150 to 500 ppm based on the total weight of monovinylidene aromatic monomer(s) and polybutadienes.

Organic solvents, optionally used in the bulk polymerization process include aromatic and substituted aromatic hydrocarbons such as benzene, ethylbenzene, toluene, xylene or the like; substituted or unsubstituted, straight or branched chain saturated aliphatics of 5 or more carbon atoms, such as heptane, hexane, octane or the like; alicyclic or substituted alicyclic hydrocarbons having 5 or 6 carbon atoms, such as cyclohexane; and the like. Preferred solvents include substituted aromatics, with ethylbenzene and xylene being most preferred.

In general, the solvent is employed in amounts sufficient to improve the processability and heat transfer during polymerization. Such amounts will vary depending on the rubber, monomer and solvent employed, the process equipment and the desired degree of polymerization. If employed, the solvent is generally employed in an amount of up to 35 weight percent, preferably from 2 to 25 weight percent, based on the total weight of the solution.

Transfer agents include n-octyl mercaptan, t-octyl mercaptan, n-decyl mercaptan, n-dodecyl mercaptan, t-dodecyl mercaptan, tridecyl mercaptan, tetradecyl mercaptan, n-hexadecyl mercaptan, t-nonyl mercaptan, ethyl mercaptan, isopropyl mercaptan, t butyl mercaptan, cyclohexyl mercaptan, benzyl mercaptan and mixtures thereof.

The one or more transfer agent(s), if employed, is (are) generally added in an amount of up to 5000 ppm, preferably between 50 and 3000 ppm, more preferably between 100 and 2000 ppm.

Preferably the polymerization is carried out in a continuous multi-reactor process, performed in a multiple series-connected stirred vessels with continuous flow, each stirred vessel having an optimum temperature range.

Preferably the polymerization is carried out in at least two connected stirred reactors.

An example of the polymerization process comprises sequences of:

- a first reactor standing at a temperature comprised between 90 and 130° C., preferably between 110 and 130° C. wherein a monomer conversion comprised between 5 and 20%, preferably between 10 and 20% is obtained;
- a second reactor standing at a temperature comprised between 110 and 150° C., preferably between 130 and 150° C. wherein a monomer conversion comprised between 15 and 40%, preferably between 20 and 40% is obtained;
- a third reactor standing at a temperature comprised between 140 and 170° C., preferably between 150 and 170° C. wherein a monomer conversion comprised between 30 and 70%, preferably between 40 and 70% is obtained; and a fourth reactor standing at a temperature comprised between 150 and 190° C., preferably between 170 and 190° C. wherein a monomer conversion comprised between 60 and 90%, preferably between 70 and 90% is obtained.

The first reactor is preceded by a mixing/dissolving vessel wherein a mixture/solution is prepared, comprising:

- the monovinylidene aromatic monomers, preferably styrene monomers;
- one or more polybutadienes (A) having
  - a cis 1,4 structure content of at least 80 weight percent, preferably of at least 85% by weight, more preferably of at least 90% by weight, most preferably of at least 95% by weight; and
  - a 1,2-vinyl contents of at most 5% by weight, preferably of at most 4% by weight, more preferably of at most 3% by weight, most preferably of at most 2.5% by weight;
- one or more polybutadienes (B), having
  - a trans 1,4 structure content of at least 25% by weight, preferably of at least 35% by weight, more preferably of at least 45% by weight, most preferably of at least 50% by weight; and
  - a 1,2-vinyl contents of at least 5% by weight, preferably of at least 7% by weight, more preferably of at least 9% by weight, most preferably of at least 10% by weight;
- optional organic solvent;

wherein:

- the concentration of polybutadiene (A) and (B) is between 5 and 25% by weight, preferably between 5 and 20% by weight, more preferably between 5 and 15% by weight, most preferably between 8 to 12% by weight of the total weight of the composition comprising the monovinylidene aromatic polymer matrix and the polybutadiene blend;
- the polybutadiene blend comprises at least 50% by weight of one or more polybutadienes (A), preferably at least 60% by weight, more preferably at least 70% by weight, most preferably at least 80% by weight of one or more polybutadienes (A), and at most 50% by weight, preferably at most 40% by weight, more preferably at most 30% by weight, most preferably at most 20% by weight of one or more polybutadienes (B).

The composition with a monomer conversion comprised between 60 and 90%, preferably between 70 and 90%, as obtained in the last polymerization reactor, is transferred to a 2 steps devolatilizing system (DV1 and DV2), downstream of the last reactor, wherein devolatilizing, to remove the unreacted monomer and a solvent, if present, is carried out at a temperature comprised between 200 and 265° C., preferably between 210 and 245° C., at a pressure comprised between 1 and 100 mbar·abs, preferably between 10 and 50 mbar·abs, most preferably between 20 and 30 mbar·abs for DV1 and at a pressure comprised between 1 and 100 mbar·abs, preferably between 1 and 50 mbar·abs, most preferably between 1 and 30 mbar·abs for DV2.

Upon completion of the polymerization up to a monomer conversion comprised between 60 and 90%, preferably between 70 and 90%, and prior to transferring to the devolatilizer, one or more retarding agent(s) optionally is (are) added to the composition in an amount up to 5000 ppm, preferably between 20 and 3000 ppm, more preferably between 50 and 2000 ppm, most preferably between 100 and 1000 ppm, said retarding agent including a free radical scavenger, a polyfunctional (meth)acrylic monomer, an allylic compound, a metal salt of an unsaturated monocarboxylic acid, a tertiary amine oxide, an aromatic tertiary amine oxide and a tertiary amine.

Compared to the commercial grades, the high impact strength thermoplastic compositions of the present invention, show an improved rheological behavior (log $\eta$ in Pa·s versus log shear rate in 1/s) at low and high shear rate, thus being advantageous for the production process.

The high Impact strength thermoplastic compositions, according to the present invention and prepared according to the process of the present invention, are characterized by an improved Notched Izod impact strength, according to ISO 180/1eA, when compared to commercial available grades of high impact strength thermoplastic compositions comprising a mixture of commercial available grades of rubber-modified polyvinylidene aromatic polymers and polyphenylene ethers, said improved impact strength exhibiting a limited decrease over a temperature range of from 23 to −20° C., contrary to the decrease in Notched Izod impact strength characteristic to the commercial available grades where the decrease is much more pronounced.

EXAMPLES

The following illustrative example is merely meant to exemplify the present invention but is not intended to limit or otherwise define the scope of the present invention.

Test Methods.

Molecular weight: The molecular weight may be measured using gel permeation chromatography. Different solvents can be used, a typical solvent is tetrahydrofuran. Polystyrene standards may be used for calibration.

The melt index of the composition is measured according to ISO 1133. For polystyrene, the melt index (MI) is measured according to ISO 1133 conditions H at 200° C. under a load of 5 kg.

The glass transition temperature was determined by the method according to ISO 11357-2:2013.

D10(v), D50(v), D90(v) μm: The volume average diameter of the rubber particles was measured by laser light scattering using the particle size analyser HORIBA 920 from Horiba Scientific. The samples were suspended in methyl ethyl ketone at a concentration of about 1% by weight. Laser light scattering results have been confirmed by scanning electron microscopy (SEM).

Annealing percentage was measured using an in-house method wherein 6 test pieces of each formulation is measured along the length using a caliper. The test pieces are placed in an oven at 150° C.±1° C. for 20 minutes. Subsequently the test pieces are cooled for 30 minutes at room temperature and the length of the test pieces is measured again.

The annealing percentage is calculated according to the following formula:

$$\text{Annealing }\%=((L0-L1)/L0)\times 100$$

L0=Initial length

L1=length after thermal treatment

Notched Izod impact of the composition was determined according to ISO 180/1eA.

Vicat Softening temperature B50 was measured according to ISO 306 at a heating rate of 50° C./hour and under a load of 50 N.

Elongation at break was performed according to ISO 527-2.

Young-modulus was determined according to ISO 527-2.

Tensile strength at yield and at break was determined according to ISO 527-2.

The Heat Deflection Temperature (HDT) was determined in accordance with ISO 75-2/A conditions 80° C., 4H, 1.8 MPA, annealed.

Example 1

Into a reactor fitted with a mechanical stirrer and a temperature control were introduced 90 parts of styrene, 10 parts of a blend of two polybutadienes along with 225 ppm of ethyl 3,3 di-t-buty peroxy butyrate, wherein 100 parts of the polybutadiene blend consist of 80 parts of Budene® 1225 from Goodyear (=polybutadiene (A) and 20 parts of Asaprene™ 730AX from Asahi_Kasei Corp. (=polybutadiene (B), said blend being characterized by a dynamic solution viscosity, as determined by Brookfield viscometer according to ISO 2555 at a concentration of 5.43% by weight in toluene, of 136 mPa·s.

The reactor while stirred at 150 rpm was heated to a temperature of 110° C. and maintained at that temperature for about 1.5 hours to obtain a monomer conversion of about 15%; subsequently the temperature was increased to 140° C. and maintained at that temperature for about 1.5 hours to obtain a monomer conversion of about 30%; thereafter the temperature was increased to 160° C. and maintained at that temperature for about 1 hour to obtain a monomer conversion of about 60%; finally the temperature was increased to 180° C. and maintained at that temperature to obtain a monomer conversion rate of about 85%.

To the composition thus obtained 250 ppm of Genox® EP (tertiary amineoxide) were added, 15 minutes before being transferred to a devolatizing unit, where unreacted monomers were removed at a temperature of 225° C. and a pressure of 10 mbar·abs.

The rubber particles were characterized by a volume average particle size (D50) of 3.4 μm, a D90 of 6.7 μm and a span of 1.44, as measured by laser light scattering.

The rubber-modified polystyrene of example 1 was characterized by a Weight average Molecular weight (Mw) of 180,000 g/mol and a dispersity ($D_M$=Mw/Mn) of 2.39 wherein Mn is the number average molecular weight, as measured by Gel Permeation Chromatography, and a Melt Index, at 200° C. under a load of 5 kg, of 2.27 g/10 min. and a glass transition temperature (DSC, 20° C./min.) of 105.5° C.

The product obtained was granulated in a manner which is known to a person skilled in the art.

Comparative Example 1

A rubber-modified polystyrene was prepared, wherein 90 parts of styrene, 10 parts of a Buna® CB 550T from Arlanxeo, along with 225 ppm of ethyl 3,3 di-t-buty peroxy butyrate were reacted according the method as disclosed in example 1.

The rubber particles were characterized by a monomodal particle size distribution with a volume average particle size by volume (D50) of 2.8 μm, a D90 of 5.9 μm and a span of 1.6, measured by laser light scattering.

The rubber-modified polystyrene of comparative example 1 was characterized by a Weight average Molecular weight (Mw) of 180,000 g/mol and a dispersity ($D_M$=Mw/Mn) of 2.39, wherein Mn is the number average molecular weight, as measured by Gel Permeation Chromatography, a Melt Index, at 200° C. under a load of 5 kg, of 2.21 g/10 min. and a glass transition temperature (DSC, 20° C./min.) of 104.5° C.

Example 2

The rubber-modified polystyrene (HIPS) of example 1 was blended with IPUIACE PX 100F from Mitsubishi (=poly(2,6-dimethyl-1,4-phenylene)ether (PPE), with an intrinsic viscosity [η] of 0.47), in a weight ratio HIPS/PPE of 75/25, 50/50 and 25/75 respectively.

Extrusion was performed in a twin-screw extruder at a temperature of 255° C. in a first zone, 270° C. in a second zone, 275 in a third zone and 280° C. in a fourth zone.

Test pieces were manufactured from the resulting extrusion samples by injection moulding.

Comparative Example 2

The rubber-modified high impact polystyrene of comparative example 1 was blended with IPUIACE PX 100F from Mitsubishi (=poly(2,6-dimethyl-1,4-phenylene)ether (PPE), with an intrinsic viscosity [η] of 0.47), in a weight ratio HIPS/PPE of 75/25, 50/50 and 25/75 respectively and extruded as in example 2.

Example 3

The Notched Izod Impact strength, according to ISO 180/eA, ($kJ/m^2$) of Example 2 and Comparative Example 2 was measured at a temperature of +23 OC and −20° C. and are reported in table 1.

TABLE 1

| | Example 2 | | | Comparative Ex. 2 | | |
|---|---|---|---|---|---|---|
| HIPS/PPE | 25/75 | 50/50 | 75/25 | 25/75 | 50/50 | 75/25 |
| Annealing (%) | 0.15 | 0.94 | 5.54 | 0.12 | 1.16 | 5.04 |
| Notched Izod @ 23° C. | 10.8 | 11.9 | 8.9 | 7.7 | 10.6 | 8.4 |
| Notched Izod @ −20° C. | 7.6 | 8.6 | 7.3 | 5.2 | 6.9 | 6.1 |

Other characteristics generally reported, such as Young modulus (ISO 527-2); Yield Stress and Stress @ Break (ISO 527-2); Vicat softening (ISO 306) and Heat Deflection Temperature (ISO 75-2A) are substantially comparable for example 2 and comparative example 2, within the experimental error, and are reported in table 2.

TABLE 2

| | Example 2 | | | Comparative Ex. 2 | | |
|---|---|---|---|---|---|---|
| HIPS/PPE | 25/75 | 50/50 | 75/25 | 25/75 | 50/50 | 75/25 |
| Annealing (%) | 0.15 | 0.94 | 5.54 | 0.12 | 1.16 | 5.04 |
| Young Modulus (MPa) | 2366 | 2128 | 1946 | 2388 | 2051 | 1916 |
| Tensile Strength @ Yield (MPa) | 68.9 | 53.5 | 39.7 | 69.8 | 53.9 | 41.8 |
| Tensile Strength @ Break (MPa) | 54.7 | 49.1 | 41.7 | 54.3 | 47.7 | 41.9 |
| Heat Deflection Temperature (° C.) | 141 | 114.3 | 92 | 141 | 116.7 | 93 |
| Vicat @ 50N (° C.) | >150 | 143.8 | 119 | >150 | 145 | 120.1 |

The invention claimed is:

1. A high impact strength thermoplastic composition comprising:

a) from 10 to 90% by weight of a rubber-modified monovinylidene aromatic (co)polymer; and b) from 10 to 90% by weight of a polyphenylene ether; wherein:

said rubber-modified monovinylidene aromatic (co)polymer comprises:

I) a matrix comprising monovinylidene aromatic polymer, and

II) from 5 to 25% by weight of rubber in the form of discrete rubber particles dispersed within the matrix, wherein the discrete rubber particles comprise a blend of at least two polybutadienes as well as graft- and block-copolymers of polybutadiene and monovinylidene aromatic polymer segments; said rubber particles exhibit:

an average particle size by volume (D50) comprised between 0.8 and 5.5 μm, measured by laser light scattering;

said blend of at least two polybutadienes comprises:

at least 50% by weight of one or more polybutadiene(s) with a cis-1,4 structure content of at least 80% by weight and greater than 0% to at most 50% by weight of one or more polybutadiene(s) with a trans-1-4 structure content of at least 25% by weight and a 1,2-vinyl content of at least 5% by weight;

said blend of at least two polybutadienes, as such and prior to being part of the rubber-modified monovinylidene aromatic (co)polymer, having a dynamic solution viscosity, at 20° C., comprised between 50 and 160 mPa·s, as determined by Brookfield viscometer according to ISO 2555 at a concentration of 5.43% by weight in toluene; and said polyphenylene ether has a repeating structural formula:

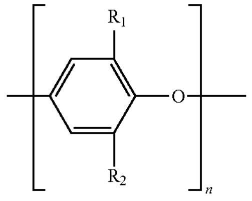

wherein R1 and R2 are independently selected from the group consisting of a hydrogen atom, a halogen atom, C1-4 alkyl radicals, C1-4 alkoxy radicals, C6-10 aromatic radicals which are unsubstituted or substituted by a C1-4 alkyl radical, halohydrocarbon radicals having at least two carbon atoms between the halogen atom and the phenyl nucleus, hydrocarbonoxy radicals, and halohydrocarbonoxy radicals having at least two carbon atoms between the halogen and the phenyl nucleus, and wherein n is an integer of at least 50.

2. The high impact strength thermoplastic composition according to claim 1, wherein the rubber particles of the rubber-modified monovinylidene aromatic polymer are characterized by a D90 of 12 μm or less and a span (D90−D10)/D50 equal to or less than 2.

3. The high impact strength thermoplastic composition according to claim 1, wherein the monovinylidene aromatic polymer of the rubber-modified monovinylidene aromatic polymer is the polymerization product of one or more monovinylidene vinyl aromatic compounds selected from the group consisting of styrene, alpha-methyl styrene, and ring-substituted styrenes.

4. The high impact strength thermoplastic composition according to claim 1, wherein the monovinylidene aromatic polymer of the rubber-modified monovinylidene aromatic polymer is polystyrene.

5. The high impact strength thermoplastic composition according to claim 1, wherein the monovinylidene aromatic polymer of the rubber-modified monovinylidene aromatic polymer has a weight average molecular weight comprised between 130,000 and 300,000 g/mole.

6. The high impact strength thermoplastic composition according to claim 1, wherein the rubber-modified monovinylidene aromatic polymer comprises from 8 to 12% by weight of rubber in the form of discrete, dispersed rubber particles dispersed within the polymer matrix.

7. A method for the preparation of the high Impact strength thermoplastic composition according to claim 1, the method comprising:

feeding the rubber-modified monovinylidene aromatic (co)polymer, using a first feeder, and the polyphenylene ether, using a second feeder, into an extruder, wherein the feed flow rate settings of the first and the second feeder are controlled in such a way that a feed ratio of the rubber-modified monovinylidene aromatic (co)polymer to the polyphenylene ether corresponds to the ratio of the rubber-modified monovinylidene aromatic (co)polymer to the polyphenylene ether in the final high impact strength thermoplastic composition, and extruding the mixture of the rubber-modified monovinylidene aromatic (co)polymer and the polyphenylene ether at a temperature of at least 250° C.

8. The method according to claim 7, further comprising preparing the rubber-modified monovinylidene aromatic (co)polymer by:

a1) providing a solution of a blend of at least two polybutadienes in vinyldiene aromatic monomer;

a2) polymerizing the solution of monovinylidene aromatic monomer and polybutadiene of step a1) in a continuous multi reactor process comprising at least two series-connected stirred vessels with continuous flow, starting at a temperature comprised between 9° and 130° C. and stepwise increasing to a temperature comprised between 15° and 190° C. to a monomer conversion of from 70 to 90%;

a3) devolatilizing the composition of step a2) at a temperature comprised between 21° and 255° C. and a pressure comprised between 1 and 100 mbar·abs.

9. The method according to claim 8 wherein from 5 to 15% by weight of a blend of at least two polybutadienes is provided in step a1).

10. The method of claim 8, wherein one or more polymerization initiator(s) are provided in step a2), said one or more polymerization initiator(s) being free radical initiator (s).

11. The method of claim 8, wherein one or more retarding agent(s), selected from the group consisting of one or a mixture of a free radical scavenger, a polyfunctional (meth) acrylic monomer, an allylic compound, a metal salt of an unsaturated monocarboxylic acid, a tertiary amine oxide, an aromatic tertiary amine oxide, and a tertiary amine, is (are) added before initiation of step a3).

12. The high impact strength thermoplastic composition of claim 1, wherein the composition has rubber-modified monovinylidene aromatic (co)polymer composition according to claim 1, having:

an Izod impact strength, according to ISO 180/1eA, of at least 8.5 $kJ/m^2$, measured at 23° C.;

an Izod impact strength, according to ISO 180/1eA, of at least 7 $kJ/m^2$, measured at −20° C.;

a young modulus, according to ISO 527-2, of at least 1900 MPa; and a tensile strength at break, according to ISO 527-2, of at least 40 MPa.

13. A high impact strength thermoplastic composition comprising:

a) from 10 to 90% by weight of a rubber-modified monovinylidene aromatic (co)polymer; and b) from 10 to 90% by weight of a polyphenylene ether;

wherein:

said rubber-modified monovinylidene aromatic (co)polymer comprises:

I) a matrix comprising monovinylidene aromatic polymer, and

II) from 5 to 25% by weight of rubber in the form of discrete rubber particles dispersed within the matrix, wherein the discrete rubber particles comprise a blend of at least two polybutadienes as well as graft- and block-copolymers of polybutadiene and monovinylidene aromatic polymer segments; said rubber particles exhibit:

an average particle size by volume (D50) comprised between 0.8 and 5.5 μm, measured by laser light scattering;

said blend of at least two polybutadienes comprises:

at least 50% by weight of one or more polybutadiene(s) with a cis-1,4 structure content of at least 80% by weight and greater than 0% to at most 50% by weight of one or more polybutadiene(s) with a trans-1-4 structure content of at least 25% by weight and a 1,2-vinyl content of at least 5% by weight;

said blend of at least two polybutadienes, as such and prior to being part of the rubber-modified monovinylidene aromatic (co)polymer, having a dynamic solution viscosity, at 20° C., comprised between 50 and 160 mPa·s, as determined by Brookfield viscometer according to ISO 2555 at a concentration of 5.43% by weight in toluene; and said polyphenylene ether has a repeating structural formula:

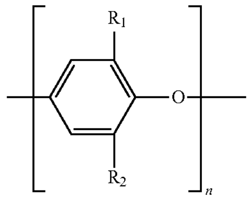

wherein R1 and R2 are independently selected from the group consisting of a hydrogen atom, a chlorine atom, a methyl radical, a phenyl radical, a t-butyl radical, a methoxy radical, an m-tolyl radical, and a p-tolyl radical, and wherein n is an integer of at least 50.

* * * * *